US011442549B1

United States Patent
Andorra

(10) Patent No.: US 11,442,549 B1
(45) Date of Patent: Sep. 13, 2022

(54) PLACEMENT OF 3D EFFECTS BASED ON 2D PAINTINGS

(71) Applicant: Apple Inc., Cupertino, CA (US)

(72) Inventor: Florent Andorra, Tiburon, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/781,043

(22) Filed: Feb. 4, 2020

Related U.S. Application Data

(60) Provisional application No. 62/802,257, filed on Feb. 7, 2019.

(51) Int. Cl.
G06F 3/01 (2006.01)
G06T 19/00 (2011.01)
G06T 7/73 (2017.01)
G06V 20/20 (2022.01)
G06V 40/20 (2022.01)

(52) U.S. Cl.
CPC .............. G06F 3/017 (2013.01); G06F 3/013 (2013.01); G06T 7/74 (2017.01); G06T 19/006 (2013.01); G06V 20/20 (2022.01); G06V 40/28 (2022.01); G06T 2210/12 (2013.01); G06T 2215/16 (2013.01)

(58) Field of Classification Search
CPC ..... G06F 3/017; G06F 3/013; G06K 9/00355; G06K 9/00671; G06T 19/006; G06T 7/74; G06T 2215/16; G06T 2210/12
See application file for complete search history.

(56) References Cited

U.S. PATENT DOCUMENTS

| 8,635,545 | B2 * | 1/2014 | Kim .................... G06F 3/0488 715/764 |
| 9,024,842 | B1 | 5/2015 | Prada Gomez et al. |
| 9,087,403 | B2 * | 7/2015 | Keating ................. A63F 13/00 |
| 9,330,478 | B2 * | 5/2016 | Anderson ........... G06F 3/04842 |
| 9,383,895 | B1 | 7/2016 | Vinayak et al. |
| 9,514,570 | B2 * | 12/2016 | Keating ............... A63F 13/211 |
| 9,715,764 | B2 * | 7/2017 | Alaniz .................... A63F 13/65 |
| 9,983,687 | B1 * | 5/2018 | Forsblom ............. G06F 3/0346 |
| 11,030,798 | B2 * | 6/2021 | Kuo ...................... G06T 19/006 |
| 11,232,646 | B2 * | 1/2022 | Goodrich .............. G06T 19/006 |
| 2011/0306413 | A1 * | 12/2011 | Bickerstaff ........... G06F 3/0346 463/31 |
| 2013/0127874 | A1 * | 5/2013 | Peterson ................. G06T 13/80 345/473 |
| 2013/0303285 | A1 * | 11/2013 | Kochi ..................... A63F 13/56 463/32 |
| 2014/0028850 | A1 * | 1/2014 | Keating ................. H04N 7/185 348/158 |
| 2015/0117777 | A1 * | 4/2015 | Hsun ........................ G06T 7/50 382/173 |

(Continued)

FOREIGN PATENT DOCUMENTS

KR WO2021172791 A1 * 9/2021 ........... G06F 3/0488

*Primary Examiner* — Motilewa Good-Johnson
(74) *Attorney, Agent, or Firm* — Thompson Hine LLP

(57) ABSTRACT

Various implementations disclosed herein include devices, systems, and methods that enable more intuitive and efficient selection and positioning of visual effects. In some implementations, a visual effect is selected and a surface of a physical element is identified for application of the visual effect based on tracking one or more positions or gestures of a user's hand.

22 Claims, 5 Drawing Sheets

(56) References Cited

U.S. PATENT DOCUMENTS

| | | | |
|---|---|---|---|
| 2015/0138234 A1* | 5/2015 | Yoon | G06T 19/006 345/633 |
| 2015/0177840 A1* | 6/2015 | Kankaanpaa | G06F 3/0304 715/863 |
| 2016/0179205 A1* | 6/2016 | Katz | G06F 3/013 345/156 |
| 2016/0370867 A1 | 12/2016 | Kim et al. | |
| 2016/0379408 A1 | 12/2016 | Wright et al. | |
| 2017/0221276 A1* | 8/2017 | Osborn | G06T 11/40 |
| 2017/0257594 A1* | 9/2017 | Goslin | G06T 19/006 |
| 2017/0272654 A1* | 9/2017 | Poindexter, Jr. | H04N 5/23216 |
| 2018/0004286 A1* | 1/2018 | Chen | G06F 3/012 |
| 2019/0362557 A1* | 11/2019 | Lacey | G06F 3/012 |
| 2020/0192480 A1* | 6/2020 | Cruz Hernandez | G06F 3/017 |
| 2020/0202632 A1* | 6/2020 | Goodrich | G06F 3/011 |
| 2020/0226814 A1* | 7/2020 | Tang | G02B 27/017 |
| 2020/0387287 A1* | 12/2020 | Ravasz | G06F 3/04815 |
| 2021/0141460 A1* | 5/2021 | Gellersen | G06F 3/0304 |

\* cited by examiner

PLACEMENT OF 3D EFFECTS BASED ON 2D PAINTINGS

CROSS-REFERENCE TO RELATED APPLICATIONS

This Application claims the benefit of U.S. Provisional Application Ser. No. 62/802,257 filed Feb. 7, 2019, which is incorporated herein in its entirety.

TECHNICAL FIELD

The present disclosure generally relates to creating visual effects in graphics, and in particular, to systems, methods, and devices for selecting, inserting, and positioning visual effects in graphical environments.

BACKGROUND

Creating visual effects in 3D content can be very time consuming, non-intuitive, and difficult. Such creation often requires using a mouse or other computer-based input device to painstakingly select, position, and rotate visual effects in precise positions and relative to 3D objects.

SUMMARY

Various implementations disclosed herein include devices, systems, and methods that enable more intuitive and efficient selection and positioning of visual effects. In some implementations, a device having a processor implements a method to apply a visual effect in a graphical environment. The visual effect is applied to a depiction of a physical element from a physical environment, for example, filling a depiction of a real-world vase with virtual water. In some implementations, the device executes instructions to provide visibility of a physical element, obtain selection of a visual effect, and detect a movement path of an input object. For example, such selection and movement path may be based on a user's hand, a hand-held controller, or a wearable controller. The device further executes instructions to determine a placement position for the visual effect using the detected movement path relative to a viewing perspective and a position of the physical element and present the visual effect at the placement position.

In some implementations, the device identifies a user selection of a visual effect based on a user selection. For example, the device may identify a user's selection based on tracking a position or gesture of the user's hand. Moreover, in some implementations, the device tracks a movement path of the user's hand relative to a reference position in the environment. For example, the device may track the position or movement of the user's hand relative to one or both of the user's eyes, for example, during a painting motion that the user makes with his or her hands or fingers.

In some implementations, the device determines the user's selection of placement of the visual effect by identifying portions of a surface of the physical element based on the first movement path of the hand relative to the reference position. For example, the device may determine that the user is "painting" all or part of an interior surface of a vase or another object based on movement of the user's hand. In some implementations, to do so, the device projects rays from a reference position such as the user's eye through the tip of the user's hand or finger during the movement to determine portions of the surface that are intersected by the rays.

The device then applies the visual effect to the physical element based on the user selection of the visual effect and the user selection of the placement of the visual effect.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
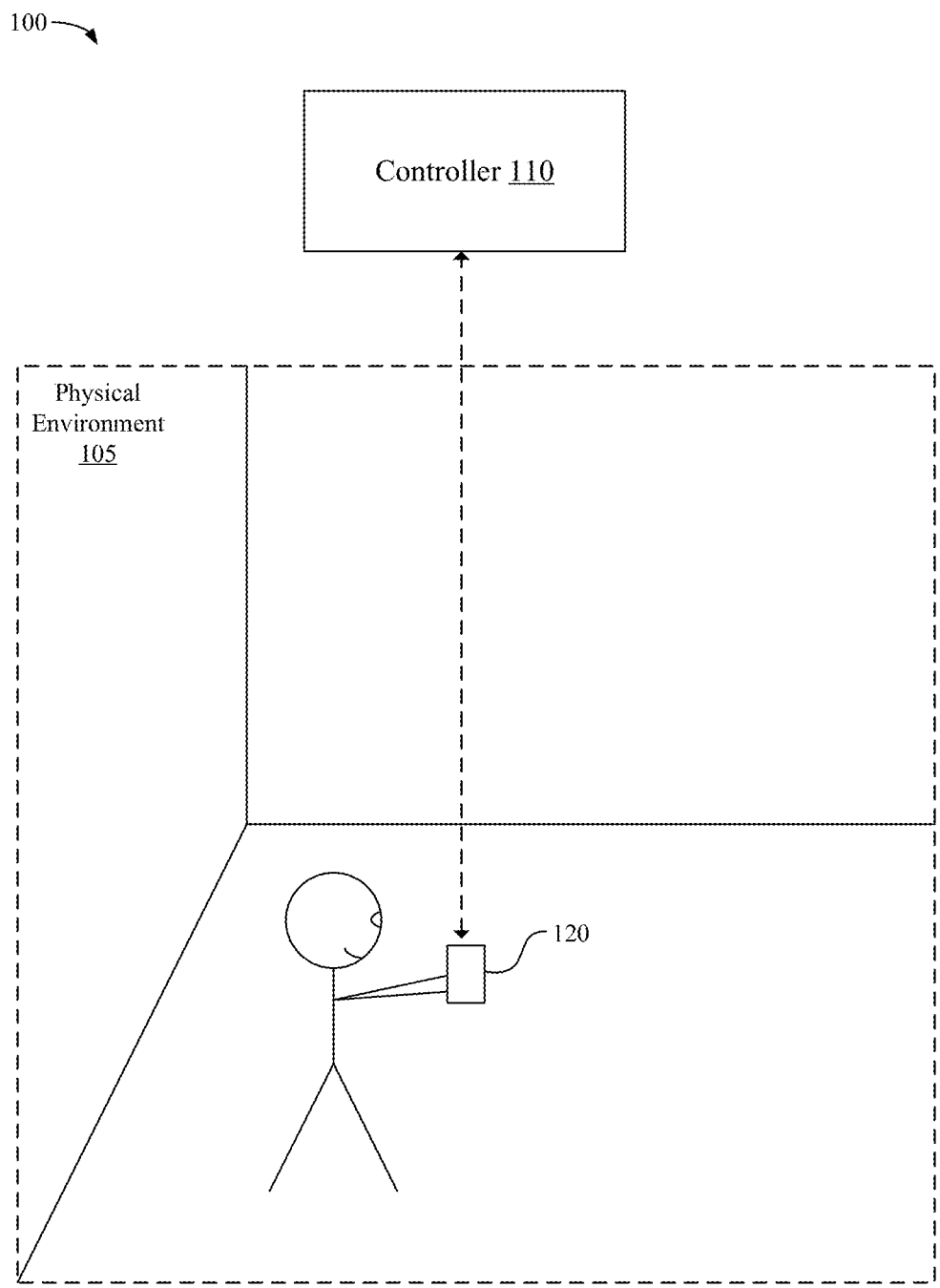
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations.

While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an device 120, one or both of which may be in a physical environment. A physical environment refers to a world that individuals can sense and/or with which individuals can interact without assistance of electronic systems. Physical environments (e.g., a physical forest) include physical objects (e.g., physical trees, physical structures, and physical animals). Individuals can directly interact with and/or sense the physical environment, such as through touch, sight, smell, hearing, and taste.

In some implementations, the controller 110 is configured to manage and coordinate a computer-generated reality (CGR) environment. In some implementations, the controller 110 includes a suitable combination of software, firmware, or hardware. The controller 110 is described in greater detail below with respect to FIG. 2. In some implementations, the controller 110 is a computing device that is local or remote relative to the physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the device 120 via one or more wired or wireless communication channels 144 (e.g., BLUETOOTH, IEEE 802.11x, IEEE 802.16x, IEEE 802.3x, etc.).

In some implementations, the device 120 is configured to present the CGR environment. In some implementations, the device 120 includes a suitable combination of software, firmware, or hardware. The device 120 is described in greater detail below with respect to FIG. 3. In some implementations, the functionalities of the controller 110 are provided by or combined with the device 120.

According to some implementations, a CGR environment is presented to the user while the user is present within the physical environment 105. A computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
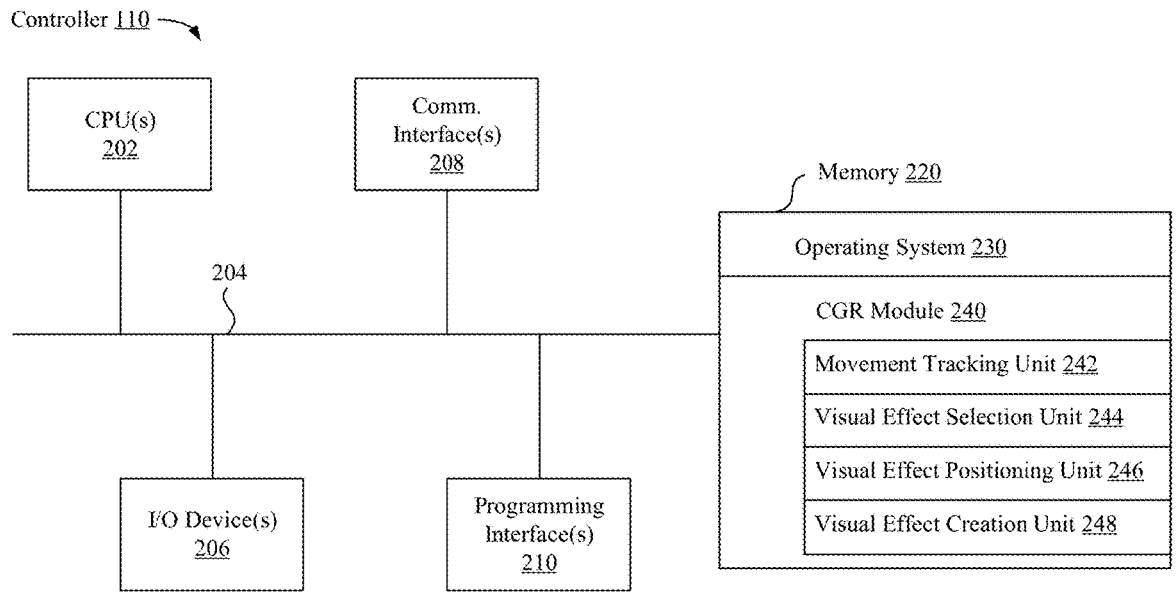
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR module 240.

The operating system 230 includes procedures for handling various basic system services and for performing hardware dependent tasks. In some implementations, the CGR module 240 is configured to create, edit, or experience CGR experiences. In some implementations, a movement tracking unit 242 is configured to track the movement, pose, or path of movement (e.g., hand movement, finger positioning, etc.) of a user. In some implementations, a visual effect selection unit 244 is configured to select a visual effect and a visual effect positioning unit 246 is configured to identify a desired placement or position of a visual effect, respectively based on one or more user inputs, such as a hand movement tracked by movement tracking unit 242. For example, the visual effect positioning unit 246 may be configured to facilitate the positioning of visual effects during such a 3D content creation or editing experience using the positioning techniques disclosed herein, e.g., using movement path of a user's hand relative to a reference position on a CGR environment. In some implementations, a visual effect creation unit 248 is configured to create and edit visual effects that will be used as part of CGR environments for one or more users (e.g., a single CGR environment for one or more users, or multiple CGR experiences for respective groups of one or more users). A content-creation CGR environment may be provided by the CGR module 240 to facilitate the creation of such content. For example, the user may view and otherwise experience a CGR-based user interface that allows the user to select, place, move, and otherwise configure visual effects in 3D content that is being created or edited, for example, based on providing input via hand gestures, voice commands, input device inputs, etc. Although these modules and units are shown as residing on a single device (e.g., the controller 110), it should be understood that in other implementations, any combination of these modules and units may be located in separate computing devices.

Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3:
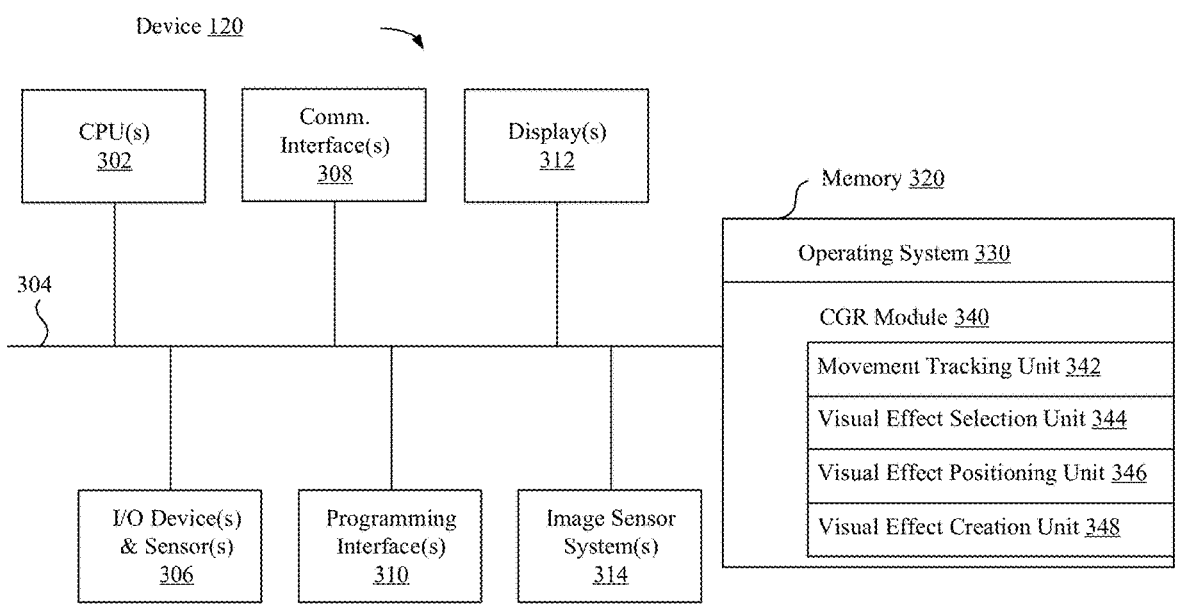
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIRE-WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the device 120 includes a single display. In another example, the device 120 includes a display for each eye of the user.

In some implementations, the one or more exterior facing image sensor systems 314 are configured to obtain image data that corresponds to at least a portion of the face of the user that includes the eyes of the user. For example, the one or more exterior facing image sensor systems 314 include one or more RGB camera (e.g., with a complimentary metal-oxide-semiconductor (CMOS) image sensor or a charge-coupled device (CCD) image sensor), monochrome camera, IR camera, event-based camera, or the like. In various implementations, the one or more exterior facing image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 33 and a CGR module 340.

The operating system 330 includes procedures for handling various basic system services and for performing hardware dependent tasks. In some implementations, the CGR module 340 is configured to create, edit, or experience CGR environments. In some implementations, a movement tracking unit 342 is configured to track the movement, pose, or path of movement (e.g., hand movement, finger positioning, etc.) of a user. In some implementations, a visual effect selection unit 344 is configured to select a visual effect and a visual effect positioning unit 346 is configured to identify a desired placement or position of a visual effect, respectively based on one or more user inputs, such as a hand movement tracked by movement tracking unit 342. For example, the visual effect positioning unit 346 may be configured to facilitate the positioning of visual effects during such a 3D content creation or editing experience using the positioning techniques disclosed herein, e.g., using movement path of a user's hand relative to a reference position on a CGR environment. In some implementations, a visual effect creation unit 348 is configured to create and edit visual effects that will be used as part of CGR environments for one or more users (e.g., a single CGR environment for one or more users, or multiple CGR experiences for respective groups of one or more users). A content-creation CGR environment may be provided by the CGR module 340 to facilitate the creation of such content. For example, the user may view and otherwise experience an CGR-based user interface that allows the user to select, place, move, and otherwise configure visual effects in 3D content that is being created or edited, for example, based on providing input via hand gestures, voice commands, input device inputs, etc. Although these modules and units are shown as residing on a single device (e.g., the device 120), it should be understood that in other implementations, any combination of these modules and units may be located in separate computing devices.

Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

In some implementations, a method or system is implemented by performing operations based on instruction from a non-transitory computer-readable storage medium. In some implementations, the operations provide visibility of a physical element. In some implementations, the operations involve obtaining images of a physical environment. Providing visibility of the physical element may involve providing visibility of the physical element and the physical environment in a computer-generated reality (CGR) environment based, at least in part, upon such images.

The operations may involve obtaining selection of a visual effect and detecting a movement path of an input object. For example, such selection and movement path may be based on a user's hand, a hand-held controller, or a wearable controller. In some implementations, obtaining the selection involves identifying a hand gesture based on tracking hand motion and identifying a type of the visual effect based on the hand gesture. In some implementations, the movement path is based on device position, hand position, and/or eye position.

The operations further determine a placement position for the visual effect using the detected movement path relative to a viewing perspective and a position of the physical element and present the visual effect at the placement position. The placement position may abuts a surface of the physical element when viewing the physical element from the viewing perspective. In some implementations, determining the placement position involves identifying a type of motion based on the movement path. For example, an automated gesture recognition machine learning model or algorithm may be applied to recognize a painting type of motion.

In some implementations, the operations involve tracking a second movement that is different from the first movement. For example, the first movement may be a translation and the second movement may be a rotation, or vise versa. In another example, the first movement may be a hand movement and the second movement may be a finger movement, or vise versa. In another example, the first movement may be a translation and the second movement may involve interaction with an input device, or vise versa. In some implementation, only one of the first movement path and the second movement path corresponds to translation movement and this difference facilitates distinguishing the different movement paths from one another and associating the different movement paths with different user intentions. In some implementations, the visual effect is configured based on the second movement path, e.g., by changing a volume of the visual effect.

Figure 4:
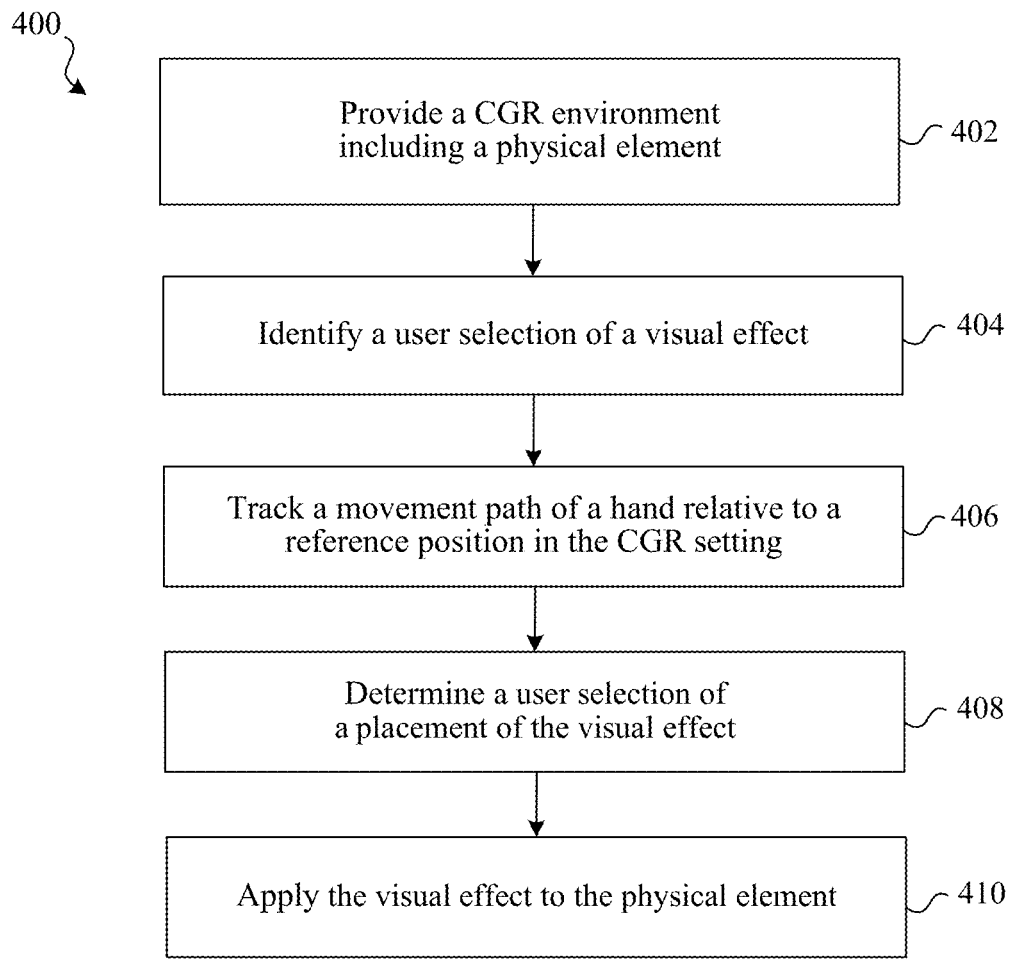
FIG. 4 is a flowchart illustrating an exemplary method of applying a visual effect to a physical element, according to some implementations.

FIG. 4 is a flowchart illustrating an exemplary method of applying a visual effect to a physical element from a physical environment in a CGR environment, according to some implementations. In some implementations, the method 400 is performed by a device (e.g., controller 110 or device 120 of FIGS. 1-3). For example, the method 400 may be performed at a mobile device, HMD, desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

At block 402, the method 400 provides a CGR environment including a physical element. The CGR environment may depict a combination of 3D content for a real-world scene (e.g., via locally captured images of the real-world scene) and 3D content corresponding to virtual content. Various implementations may provide the CGR environment in different environments/viewing modes (e.g., monoscopically, stereoscopically, etc.).

In some implementations, a device (e.g. device 120) displays the CGR environment such that a user can simultaneously view the real-world scene on a display of the device, i.e., the user displays the CGR content in a real-world coordinate system with real-world content. Such a CGR viewing mode includes visual content that combines the CGR content with the real-world content of the real-world scene. CGR can be video-see-through (e.g., in which real-world content is captured by a camera and displayed on a display with the 3D model) or optical-see-through (e.g., in which real-world content is viewed directly or through glass and supplemented with displayed 3D model). For example, a CGR system may provide a user with video see-through CGR on a display of a consumer cell-phone by integrating rendered three-dimensional (3D) graphics into a live video stream captured by an onboard camera. As another example, a CGR system may provide a user with optical see-through CGR by superimposing rendered 3D graphics into a wearable see-through head mounted display (HMD), electronically enhancing the user's optical view of the real-world with the superimposed 3D model.

In some implementations, the physical element is a planar physical surface of a real-world object or the real-world environment. In some other implementations, the physical element is a non-planar surface of a real-world object or the physical environment. For example, the physical element may be a wall of a room, a coastline, the horizontal surface of a table, the concave interior surface of a bowl resting on a table, etc.

At block 404, the method 400 identifies a user selection of a visual effect. In some implementations, the method 400 receives an input initiating selection of a visual effect. For example, a user interface may be displayed to the user (e.g., by device 120); the user interface may present a number of different special effect options from which the user may choose. In some implementations, the input is obtained by identifying a 3D hand gesture, e.g., a user swipes through the options by moving their hand and makes a selection based on hand/finger pose (e.g., making a fist, extending a single finger, etc.). In other implementations, the input is obtained by identifying 3D movement of a 3D input device, e.g., a user may select from a table of visual effect options using a six degree of freedom input device. The input may include, for example, selection of a particle effect, e.g., a fire effect, a water effect, a dirt effect, a dust effect, a sparks effect, etc.

At block 406, the method 400 tracks a movement path of a hand relative to a reference position in the CGR environment. In some implementations, the method 400 includes visually determining a current pose and a current location of the hand relative to a reference position. Moreover, in some implementations, after determining the hand's current state and location, the method 400 visually tracks motion of the hand from a first location and a first visual pose along a path to a second location and a second visual pose. The method 400 may track a position of a user's hand relative to one or both of the user's eyes, e.g., a painting motion made by the user with their hand.

In some implementations, the direction of a ray may be based on a reference location such as one or both of the user's eyes. Based on a correspondence between the reference location (e.g., the user's eye) and the position of the user's hand, a ray may be extended from the user's eye through a point on the user's hand or finger to track the position of the user's hand or finger. For example, the user may move their hand between their eye and an object (e.g., a bowl or vase) so that, from the perspective of the user, the user's hand overlaps a desired surface of the object. Thus, the user clearly correlates the painting motion of their hand to the desired surface of the object. Accordingly, by tracking the position of the user's hand relative to the user's eye, implementations provide a natural user experience that does not necessarily require the user to proximately touch, or virtually touch, the desired surface of the object.

At block 408, the method 400 determines a user selection of a placement of the visual effect by identifying portions of a surface of the physical element based on the first movement path of the hand relative to the reference position. In some implementations, the method 400 determines that the user is "painting" all or part of a surface of the physical element based on the movement path of the hand. For example, the method 400 may project rays from the reference position (e.g., the user's eye) through the tip of the user's hand/finger during the movement to determine portions of the surface that are intersected by the rays. In some implementations, the user selection forms a bounding area for the visual effect. For example, the visual effect may be bounded by the "painted" portion of the surface of the physical element.

At block 410, the method 400 applies the visual effect to the physical element in the CGR environment based on the user selection of the visual effect and the user selection of the placement of the visual effect. For example, applying the visual effect can involve changing the depicted CGR environment by adding water to the interior of a vase, where the water effect is determined based on the user selection of the visual effect and the surface of the vase is determined based on the user selection of the placement of the visual effect.

Figure 5:
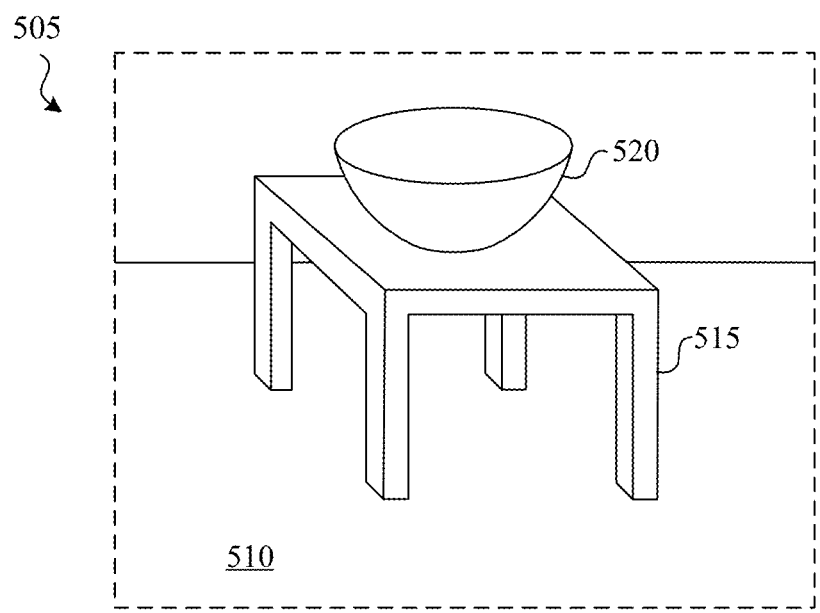
FIG. 5 is a block diagram illustrating a real-world object in a computer-generated reality (CGR) environment, according to some implementations.

FIGS. 5 through 8 illustrate a visual effect being applied to a physical element from a physical environment in a CGR environment 505. FIG. 5 is a block diagram illustrating a physical element 520 (e.g., a bowl) from the real world in a CGR environment 505. In the illustrative CGR environment 505, the physical element 520 is resting on a real-world table 515, which in turn, is supported by a real-world floor 510.

Figure 6:
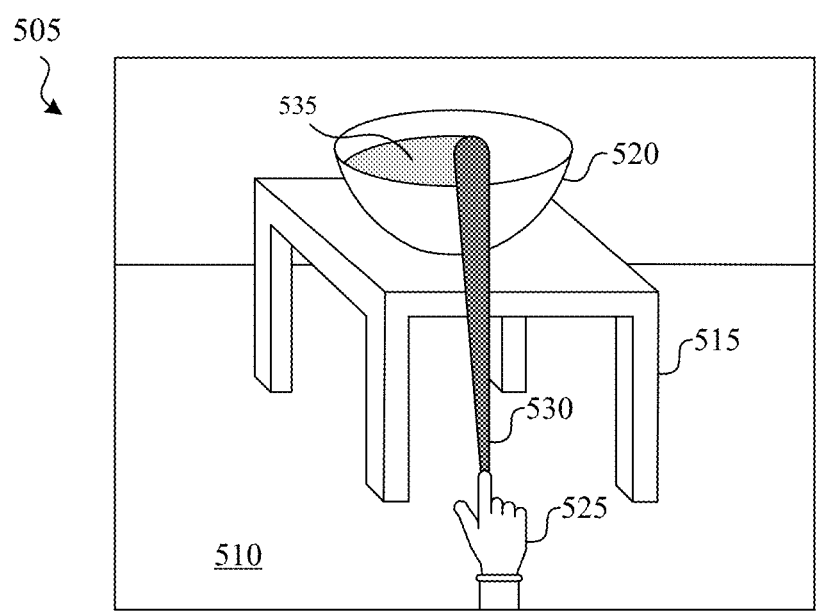
FIG. 6 is a block diagram illustrating a user action identifying placement of a visual effect, according to some implementations.

FIG. 6 is a block diagram illustrating a user action identifying placement of a visual effect in a CGR environment (e.g., CGR environment 505). In this example, a gesture is used to "paint" a real-world object. In implementations, a movement of a user's hand 525 is tracked. For example, the user may position the hand 525 and based on hand or finger pose, hand positioning, or movement path, selection of a visual effect, and placement of the visual effect, may be determined. In implementations, a ray 530 is projected from the hand 525 (e.g., an index finger), an extension of the user (e.g., a wand, pointer, etc.), or one or both of the user's eyes. Moreover, the ray 530 may be used to determine an identified surface 535 for placement of the visual effect. For example, the ray 530 projected from the hand 525 may "paint" (i.e., mark or otherwise identify a selection) the identified surface 535 (e.g., an interior surface of physical element 520). The direction of such a ray can be based on a reference location such as the user's eye or otherwise determined. In one example, the ray is extended from the user's eye through a point on the user's hand or finger to determine a portion of an object's surface that the ray intersects. In another example, a ray is extended based on the direction of the user's hand or a finger of the user's hand, e.g., along an axis of the user's finger, to similarly determine a portion of an object's surface that the ray intersects.

Figure 7:
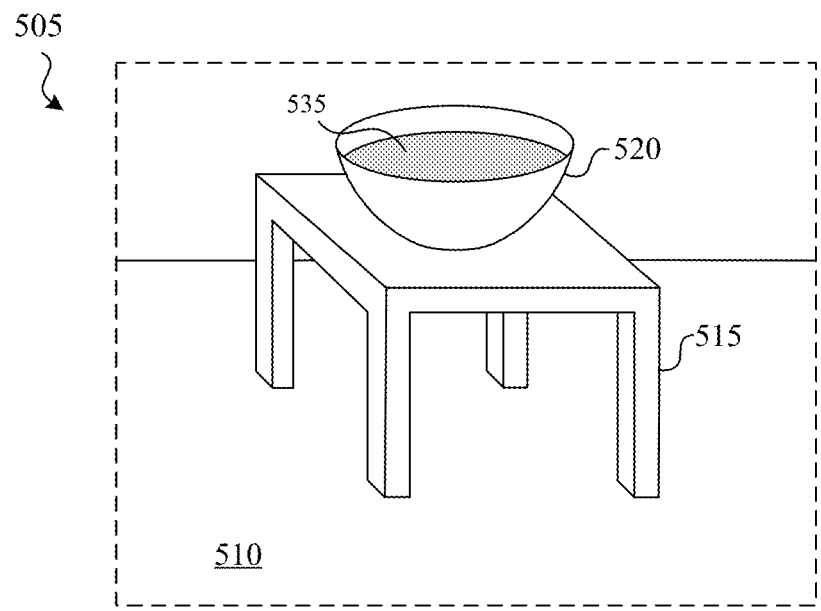
FIG. 7 is a block diagram illustrating an identification of a real-world surface for placement of a visual effect, according to some implementations.

FIG. 7 is a block diagram illustrating the identified surface 535 of a real-world surface for placement of a visual effect in a CGR environment. Specifically, identified surface 535 of the physical element 520 (e.g., a bowl) has been marked or painted for placement of the visual effect in the CGR environment 505. In some implementations, the device identifies symmetrical (or otherwise related features in an object surface being identified and automatically, e.g., based on user authorization, identifies surface portions that are similar to surface portions identified by the user. For example, the device may receive input from the user painting one side of an inside surface of a bowl and automatically identify the symmetrical portions on the other side of the inside of the bowl. In another example, the device identifies related parts of a surface based on surface characteristics. For example, the device may receive input from the user painting a small part of an inside surface of a bowl and automatically identify the rest of the inside surface of the bowl. The device may distinguish, in this example, between the inside and outside surface of the bowl by analyzing attributes of a 3D model of the bowl, e.g., normal directions, etc.

Figure 8:
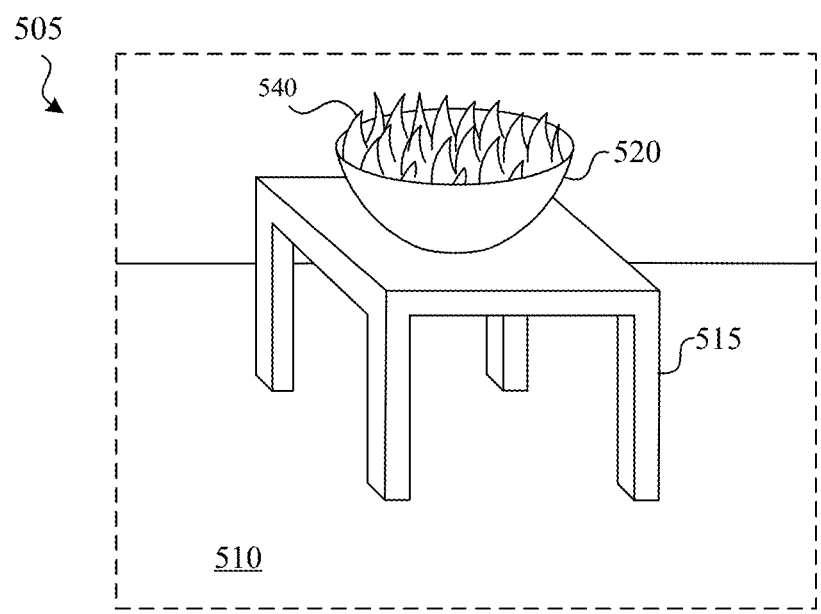
FIG. 8 is a block diagram illustrating a visual effect applied to a real-world object, according to some implementations.

FIG. 8 is a block diagram illustrating a visual effect 540 (e.g., fire or flames) applied to the physical element 520 (e.g., a bowl) in CGR environment 505. The visual effect 540 is placed according to the identified surface 535. In implementations, the visual effect 540 is bounded by the identified surface 535. For example, particle effects, such as a fire effect, a water effect, a dirt effect, a dust effect, or a sparks effect, may be applied to the identified surface 535. In some implementations, the identified portion of the surface of the physical element defines a bounding box for the visual effect (e.g., a volume or height of the visual effect). The bounding box may be displayed to facilitate better user understanding of the area that will be impacted by the visual effect. For example, a visual effect 540 of water may rise only to the volume of the identified surface 535 that is enclosed by the bounding box. In some implementations, an additional user input (e.g., an additional movement path of the user's hand) may be used to adjust the visual effect 540 (e.g., changing a field or volume of the visual effect or reshaping a geometry of the visual effect). For example, a user may raise or lower their hand to increase or decrease the height of a bounding box for the visual effect (e.g., increasing the height of rising flames or sparking).

The various implementations disclosed herein provide techniques for selecting and positioning visual effects in a CGR environment that are intuitive and easy to use. Accordingly, the user experience may be improved because the user can more easily and efficiently edit and interact with the CGR environment. With such visual effect selection and placement techniques, the user can often avoid having to spend time tediously aligning or positioning visual effects. Automatic precision placement in the context of developing 3D apps and other content in a 3D development environment can save user's significant amounts of time. A user is empowered to easily select, place, and apply visual effects at their respective intended positions. After marking a surface for placement of a visual effect, the visual effect may be applied to the identified surface without necessarily needing the user to take further action. The user's interactions can be minimal, e.g., requiring that the user only mark the identified surface, to achieve the desired visual effect in the desired location.

The techniques disclosed herein are applicable in numerous different contexts. In some implementations, the techniques are used to create or edit 3D content that will be included in a CGR-based game, app, video, or user interface. In some implementations, the techniques are used to place visual effects in a room or other indoor environment in a CGR environment. In other implementations, the techniques are used to place visual effects in a virtual outdoor world that includes, for example, trees, grass, architectural structures in a CGR environment.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing instructions executable on a device to perform operations comprising:
   providing visibility of a physical element;
   obtaining selection of a visual effect;
   detecting a direction and a movement path of an input object based on projecting a ray from an eye of a user through the input object, wherein the input object is associated with a hand of the user;

determining a placement position for the visual effect upon the physical element based on determining an intersection of the ray with a portion of the physical element;

determining a translation of the visual effect based on the detected direction and movement path of the input object; and presenting a view of the translation of the visual effect upon the physical element at the placement position.

2. The non-transitory computer-readable storage medium of claim 1, wherein presenting the visual effect at the placement position causes the presented visual effect to abut a surface of the physical element when viewing the physical element from a viewing perspective.

3. The non-transitory computer-readable storage medium of claim 1, wherein the operations further comprise:
obtaining images of a physical environment, and
wherein providing the visibility of the physical element comprises displaying at least portions of the obtained images on a screen.

4. The non-transitory computer-readable storage medium of claim 1, wherein obtaining the selection comprises identifying a gesture based on tracking hand motion and identifying a type of the visual effect based on the gesture.

5. The non-transitory computer-readable storage medium of claim 1, wherein detecting the direction and the movement path comprises detecting a position of the device relative to the physical element.

6. The non-transitory computer-readable storage medium of claim 1, wherein determining the placement position comprises identifying a type of motion based on the detected direction and the movement path.

7. The non-transitory computer-readable storage medium of claim 1, wherein the operations further comprise displaying a bounding box for the visual effect.

8. The non-transitory computer-readable storage medium of claim 1, wherein the operations further comprise:
tracking the direction and the movement path, and translating the visual effect in accordance with the tracked direction and the tracked movement path; and
tracking a second direction and a second movement path of the input object, and adjusting a volume of the visual effect in accordance with the tracked second direction and the tracked second movement path.

9. The non-transitory computer-readable storage medium of claim 1, wherein the visual effect is a particle effect.

10. The non-transitory computer-readable storage medium of claim 1, wherein the detected direction and the movement path is based on an extension of: i) a pointing finger of the user, or ii) a wand in the hand of the user.

11. The non-transitory computer-readable storage medium of claim 1, wherein the detected direction and the movement path is based on a reference position from the eye of the user to an end of the hand or an end of a finger of the user.

12. The non-transitory computer-readable storage medium of claim 1, wherein detecting the direction and the movement path comprises projecting a second ray from the hand of the user or another device held by the user.

13. A system comprising:
a device;
a processor; and
a computer-readable storage medium comprising instructions that upon execution by the processor cause the system to perform operations, the operations comprising:
providing visibility of a physical element;
obtaining selection of a visual effect;
detecting a direction and a movement path of an input object associated with a hand of a user based on projecting a ray from an eye of the user through the input object;
determining a placement position for the visual effect upon the physical element using the detected direction and movement path of the input object based on determining an intersection of the ray with a portion of the physical element;
determining a translation of the visual effect based on the detected direction and movement path of the input object; and
presenting a view of the translation of the visual effect upon the physical element at the placement position.

14. The system of claim 13, wherein presenting the visual effect at the placement position causes the presented visual effect to abut a surface of the physical element when viewing the physical element from a viewing perspective.

15. The system of claim 13, wherein obtaining the selection comprises identifying a gesture based on tracking hand motion and identifying a type of the visual effect based on the gesture.

16. The system of claim 13, wherein detecting the direction and the movement path comprises detecting a position of the device relative to the physical element.

17. The system of claim 13, wherein determining the placement position comprises identifying a type of motion based on the detected direction and the movement path.

18. The system of claim 13, wherein the operations further comprise:
tracking the direction and the movement path, and translating the visual effect in accordance with the tracked direction and the tracked movement path; and
tracking a second direction and a second movement path of the input object, and adjusting a volume of the visual effect in accordance with the tracked second direction and the tracked second movement path.

19. A method comprising:
at a device with a processor:
providing visibility of a physical element;
obtaining selection of a visual effect;
detecting a direction and a movement path of an input object associated with a hand of a user based on projecting a ray from an eye of the user through the input object;
determining a placement position for the visual effect upon the physical element based on determining an intersection of the ray with a portion of the physical element;
determining a translation of the visual effect based on the detected direction and movement path of the input object; and
presenting a view of the translation of the visual effect upon the physical element at the placement position.

20. The method of claim 19, wherein presenting the visual effect at the placement position causes the presented visual effect to abut a surface of the physical element when viewing the physical element from a viewing perspective.

21. The method of claim 19, wherein obtaining the selection comprises identifying a gesture based on tracking hand motion and identifying a type of the visual effect based on the gesture.

22. The method of claim 19, wherein the detected direction and the movement path is based on device position or a position of the eye of the user.

\* \* \* \* \*

UNITED STATES PATENT AND TRADEMARK OFFICE
CERTIFICATE OF CORRECTION

| | |
|---|---|
| PATENT NO. | : 11,442,549 B1 |
| APPLICATION NO. | : 16/781043 |
| DATED | : September 13, 2022 |
| INVENTOR(S) | : Florent Andorra |

It is certified that error appears in the above-identified patent and that said Letters Patent is hereby corrected as shown below:

In the Claims

Claim 12, Column 15, Lines 61-64, reads:
"The non-transitory computer readable storage medium of claim 1, wherein detecting the direction and the movement path comprises projecting a second ray from the hand of the user or another device held by the user."

Should read:
-- The non-transitory computer-readable storage medium of claim 1, wherein:
the ray is a first ray;
detecting the direction and the movement path of the input object further comprises projecting a second ray from the hand of the user or another device held by the user through the input object; and
determining the placement position for the visual effect further comprises determining an intersection of the second ray with another portion of the physical element. --

Signed and Sealed this
Twenty-fifth Day of October, 2022

*Katherine Kelly Vidal*

Katherine Kelly Vidal
*Director of the United States Patent and Trademark Office*